March 4, 1930.  J. R. ARMSTRONG  1,749,094
INTEGRATING AND RECORDING DEVICE FOR FLUID METERS
Filed July 5, 1922  3 Sheets-Sheet 1

March 4, 1930. J. R. ARMSTRONG 1,749,094
INTEGRATING AND RECORDING DEVICE FOR FLUID METERS
Filed July 5, 1922 3 Sheets-Sheet 2

INVENTOR.
James R. Armstrong
by W. G. Doolittle
Attorney.

March 4, 1930.  J. R. ARMSTRONG  1,749,094
INTEGRATING AND RECORDING DEVICE FOR FLUID METERS
Filed July 5, 1922  3 Sheets-Sheet 3

INVENTOR.
James R. Armstrong
by W. G. Doolittle
Attorney.

Patented Mar. 4, 1930

1,749,094

UNITED STATES PATENT OFFICE

JAMES R. ARMSTRONG, OF PITTSBURGH, PENNSYLVANIA, ASSIGNOR TO PITTSBURGH EQUITABLE METER COMPANY, OF PITTSBURGH, PENNSYLVANIA, A CORPORATION OF PENNSYLVANIA

INTEGRATING AND RECORDING DEVICE FOR FLUID METERS

Application filed July 5, 1922. Serial No. 572,846.

This invention is for an integrating and recording device for fluid meters, particularly meters used in the measurement of gases.

In the use and sale of gases, it is necessary to measure the gas in units of a fixed constant value. It is well known, however, that the density of a gas increases with the pressure of the gas. Consequently, it is necessary to reduce in terms the volume of gas passing through a pipe or main or other conduit at fluctuating pressures and at pressures above or below the pressure at which the gas is to be used or sold to the volume it is equal to at the density at which it is to be used or sold.

The most common way now in use of doing this is to insert an orifice meter or Pitot meter in the conduit and chart on separate dials the static and differential or dynamic pressures for a given period of time, and then obtain separately the average static and differential pressures for that time, say twenty-four hours, after which the volume of gas at the density it is to be measured is calculated according to a known constant for the orifice or Pitot tube according to the formula $$Q = C\sqrt{hp}.$$

In this formula, Q is the quantity of gas at the pressure at which it is to be used; C is the constant for the orifice meter; $h$ is the differential or dynamic pressure in inches; and $p$ is the static pressure in pounds.

In my co-pending joint applications with T. B. Wylie, Serial #461,458 and #461,459, filed April 14, 1921, there are shown devices for registering on a registering clock the quantity of gas in units of the desired constant value without requiring any mental calculations.

The present invention proposes to substitute a revolving paper chart for the metering clock to make a graphic record of the gas measured in units of a desired fixed value.

To this end, I provide a chart actuating mechanism for effecting the movement of a suitable paper or other chart. This chart actuating mechanism is moved intermittently at regular periods of time, and proportionately to the static or differential pressure, so that the movement of the chart is really a component of time and pressure. The pen which moves over the chart, and records thereon, is also pressure actuated, it being moved by static pressure when the chart actuation is controlled through differential pressure, and vice versa. The record on the chart accordingly responds to time and static and differential pressure elements.

The chart is moved proportionately to the square root of the pressure which controls its movement; the chart is calibrated in one direction according to the square roots of the pressures to which the pen responds, and the driving means for the chart includes the constant for the orifice meter for the period of time between successive movements of the chart. Thus, the record on the chart is a graphic representation of the result of the formula $$Q = C\sqrt{hp}$$

for a series of successive periods, and the position and length of a section of the line represents a given number of units of fluid at a fixed constant value. This chart reading may be translated into figures very easily.

My invention may be more readily understood by reference to the accompanying drawings which illustrate the principle of my invention, and in which.

Figure 1:
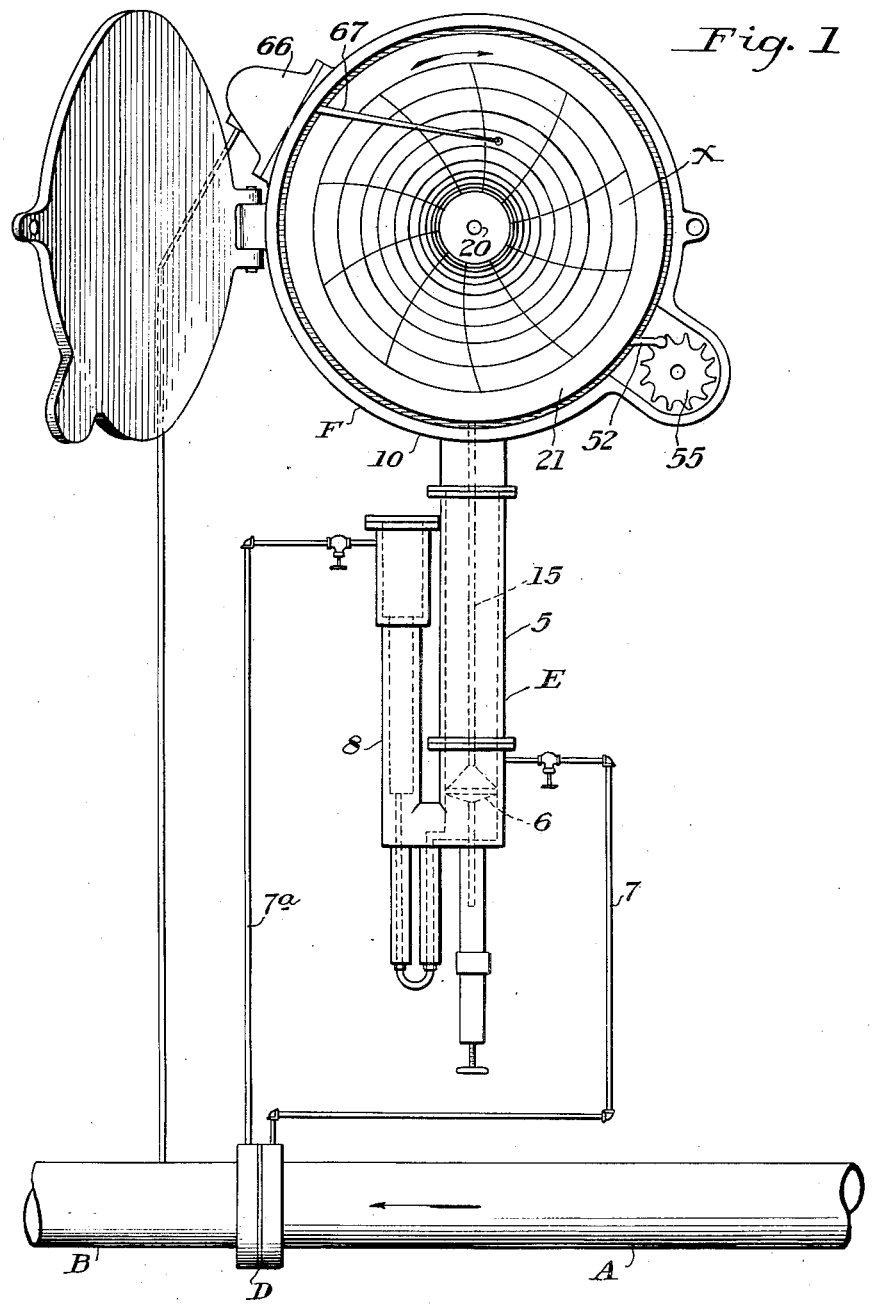
Fig. 1 is a front view of the device, showing the chart casing open, and showing the relation of the device to a pipe line having an orifice plate therein.
Figure 2:
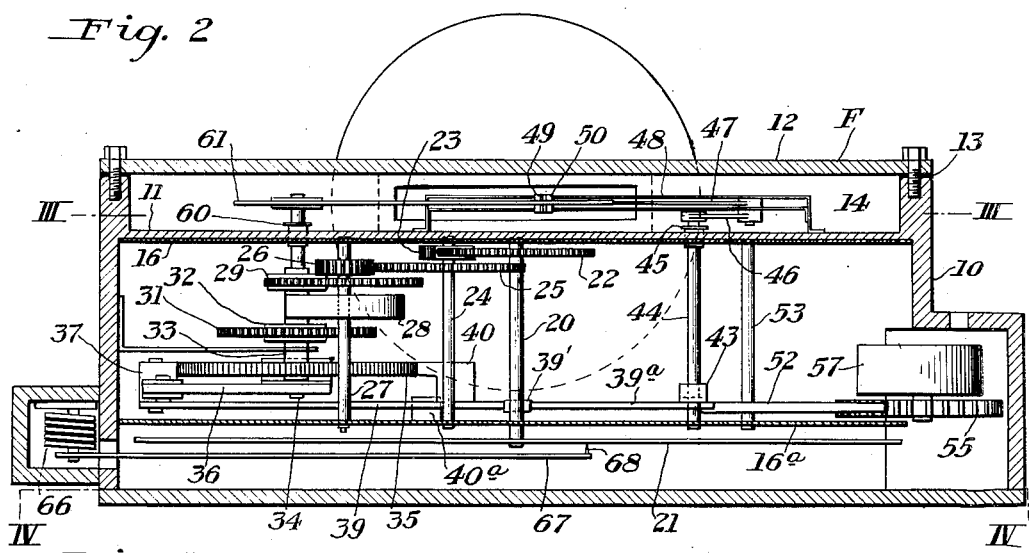
Fig. 2 is a horizontal section across the operating mechanism of the device.

In the drawings, A represents the upstream side of a pipe line, and B the downstream side, and D is the meter, such as an orifice plate interposed between the two sections. An orifice plate or meter is well known in the art, and comprises an apertured plate, the size of whose aperture is known. Knowing the size of the opening, the amount of gas which will pass through it at a given pressure, say every five minutes, or every hour, or every twenty-four hours, may be determined. This amount corresponds to the factor C of the above equation. A Pitot tube, the equivalent of the orifice meter, might be substituted, and it is intended that the term differential, hereinafter used, also includes the equivalent term "dynamic" used with reference to the Pitot tube.

E represents a differential pressure gauge and F designates, generally, the integrating and recording device.

The differential pressure gauge may be of any preferred or standard construction. A well known type is shown in the drawings. This gauge includes a vertical column 5 having a float 6 movable vertically therein, the float being lowered with the increase in differential pressure. Pipe 7 communicates pressure from one side of the meter to the interior of the column 5, and pipe 7$^a$ communicates pressure to column 8 of the gauge. Further description of the gauge per se is deemed unnecessary.

Resting on the open end of column 5, is the housing 10 of device F. This housing is in the form of an annular casing having open front and rear faces. Extending across the interior of the casing is a partition wall 11. A rear plate 12 closes the rear of the casing. This plate, which is bolted to casing 10, has a gasket 13 interposed between it and the casing, so as to form an air tight seal. An air-tight chamber 14 is thus provided which communicates with the interior of column 5.

Extending upwardly from float 6 is a rod 15 which terminates in chamber 14. Inasmuch as this rod moves with the float, it is advantageous to have chamber 14 in communication with column 5 in that, because the same pressures maintain in both the chamber and the column, no packing or bushing with its consequent friction is necessary.

Inserted against the partition wall 11, outside the chamber 14, is a supporting plate 16. Spaced forwardly from plate 16 is a second plate 16$^a$. These two plates are for the purpose of carrying the operating mechanism hereinafter described.

Journaled at its ends in plates 16 and 16$^a$, and passing through the latter plate, is a central shaft 20 which has a chart holding disk 21 fixed to its outer end. This shaft carries a gear wheel 22 which engages in pinion 23 on shaft 24 carried by plates 16 and 16$^a$. This shaft 24 also carries a large gear wheel 25 which engages pinion 26 on spring motor shaft 27. This shaft is driven by and carries a spring motor 28. This motor may be wound by a key inserted through perforations in disk 21 to engage the squared end of the shaft. Shaft 20 is thus driven by the spring motor.

Motor 28 also drives gear wheel 29 on shaft 30, and a pinion 31 on shaft 30 engages a gear wheel 32 on a sleeve 33 which surrounds and is rotatable on a shaft 34. Fixed on the sleeve 33 is a ratchet wheel 35. The ratchet wheel 35 is thus rotated by the spring motor 28, and the spring motor may be held against operation by preventing said ratchet wheel from turning.

Fixed to the end of shaft 34 is an arm 36 having a pawl 37 pivotally hung from its outer end. The pawl is adapted to be swung into and out of engagement with the teeth of ratchet wheel 35.

Pivotally connected at 38 to the pawl 37, is a reciprocable actuating rod 39. This pawl actuating rod extends across the face of the ratchet wheel 35, as shown, and has a pawl 40 thereon also adapted to be brought into engagement with the teeth of wheel 35. The pawl 40 is so located that it will engage wheel 35 only when pawl 37 is disengaged therefrom, and vice versa.

Rod 39 is preferably divided so as to comprise two sections, the one carrying the pawl 40 and another one designated 39$^a$. Interposed between the two sections is an inverted U-shaped leaf spring 39' which tends to urge the sections away from each other. The rod may be pivotally and reciprocably guided by means of pin 41 passing through slot 39'' in section 39$^a$. At the free end of section 39$^a$ is a projection or locking dog 39$^b$.

Figure 4:
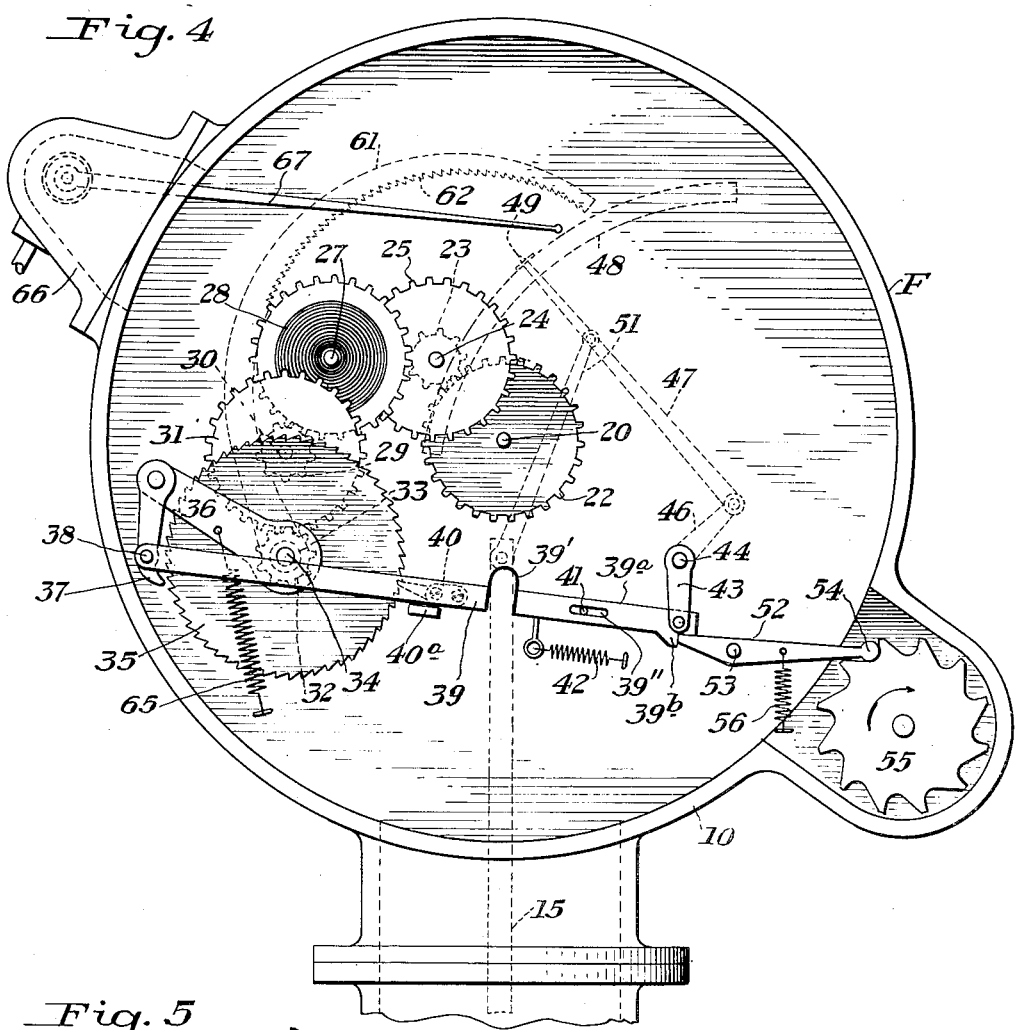
Fig. 4 is a similar view in the plane of line line IV—IV of Fig. 2.

A coil spring 42, shown in Fig. 4, tends to urge the rod in a direction to disengage pawl 40 and bring pawl 37 into engagement with the ratchet teeth of wheel 35.

The free end of rod section 39$^a$ is pivotally connected with an arm 43 on a rock shaft 44. Rock shaft 44 is supported in plates 16 and 16$^a$, and one end of the shaft passes through partition 11 into the sealed chamber 14, a gland 45 surrounding the shaft where it passes through wall 11. The end of shaft 44 within chamber 14 has fixed thereto a radial arm 46 which is out of radial alinement with arm 43.

Pivoted to the outer end of arm 46 is a pointer or stop carrying arm 47. The outer end of stop arm 47 extends between two parallel guide plates 48 suitably supported in the chamber 14. The outer projecting end of this arm has a stop 49 and wings 50 which ride over the curved guide.

Connecting the float reciprocated rod 15 with stop arm 47 is a link 51. Arm 47 and stop 49 will thus be oscillated by the up and down movement of the rod 15.

Rod 39 is normally held from moving to the position to which it is urged by means of a latch 52 pivotally supported at 53. One end of this latch engages dog 39$^b$ on rod section 39$^a$ to normally hold said rod section against reciprocable movement. The other end of latch lever 52 is provided with a suitably shaped end terminal 54 which engages in the periphery of a cam wheel 55. A spring 56 serves to urge the terminal into engagement with the cam. The cam wheel, as shown, is driven in a clockwise direction by an ordinary clock, indicated at 57. As illustrated, the cam wheel has twelve inclined surfaces thereon, so that if the wheel, which is driven continuously, rotates once in an hour, latch lever 52 will be rocked once every five minutes.

Figure 3:
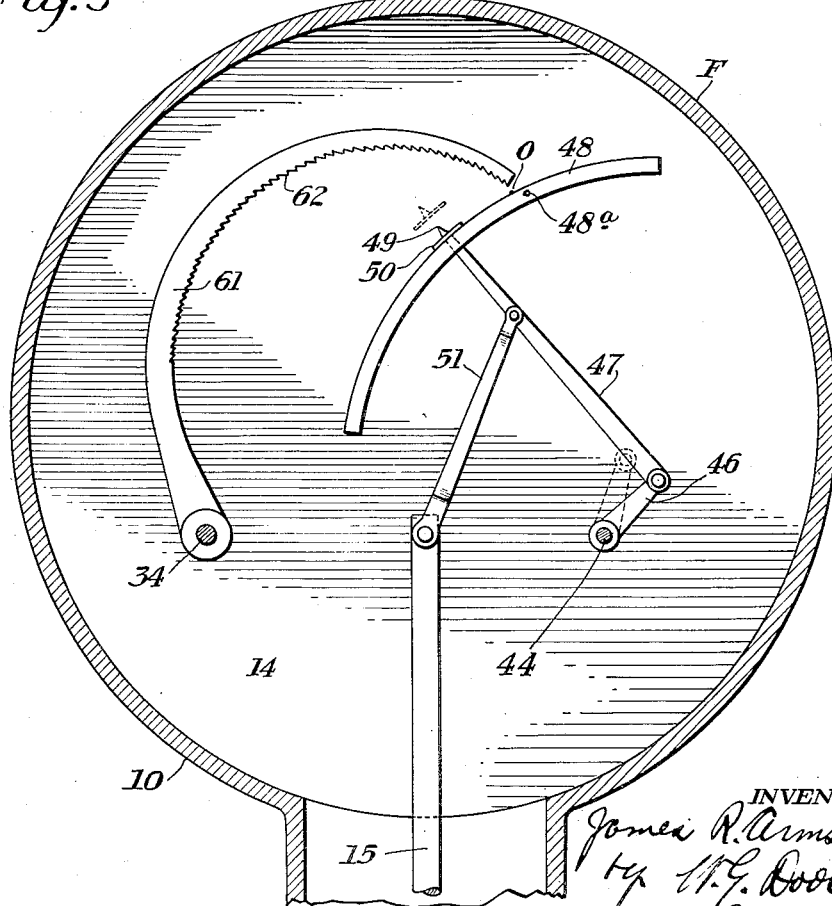
Fig. 3 is a section in the plane of line III—III of Fig. 2.

When the cam wheel rotates, one of its cam surfaces, engaging terminal 54, raises such terminal gradually, rocking the latch lever until the opposite end thereof will be released from engagement with dog 39$^b$. Spring 42 will then act to draw the rod 39 toward the right in Fig. 4, bringing pawl 37 into engagement with ratchet teeth on wheel 35 and moving pawl 40 out of engagement therewith. Such movement of rod 39 transmits a rocking motion to shaft 44 through arm 43, thereby moving arm 46 in a direction to move stop 49 up away from guide 48, as indicated in dotted lines in Fig. 3.

Shaft 34, which is inside sleeve 33 so as to be co-axial with ratchet wheel 35, and which carries arm 36 having pawl 37 at its opposite end, extends through partition 11 into chamber 14, being surrounded at 60 by a gland. The end of this shaft within chamber 14 carries an arm or frame 61 which has a curved face 62. This curvature of this face is so laid out with reference to the path through which stop 49 travels, as to bear a certain ratio to the different positions of the stop. This curvature is plotted according to the progression of the squares of the differential pressure as measured in inches of water. This curved arm is moved by rotating shaft 34, and it is adapted to contact with and be limited in its movement by stop 49 on stop arm 48.

The operation of the machine as so far described may now be readily followed. When rod 39 is held in normal position by latch 52, pawl 40 engages ratchet wheel 35 and holds the same from moving. This prevents any operation of spring motor 28 and consequently chart disk 21 is held stationary. At this time, wings 50 of stop 49 are in contact with guides 48. The stop 49 will be moved by link 51 proportionately to the movement of rod 15. As the differential pressure increases, the rod 15 will lower, drawing stop 49 further downwardly along guide 48. 0 marked on guide 48 designates the zero point where there is no differential pressure, and the stop arm is prevented from moving past that point by a stop such as pin 48$^a$.

When the latch 52 is rocked to releasing position by cam wheel 55, rod 39—39$^a$ moves as hereinbefore explained, withdrawing pawl 40 from operative position, and at the same instant, moving pawl 37 into operative position, such movement of the rod also lifting stop 49 away from guide 48, as hereinbefore described.

As soon as pawl 40 is withdrawn from operative position, spring motor 28 begins to rotate wheel 35 and chart disk 21 in a clockwise direction. Pawl 37, being in engagement with wheel 35, causes shaft 34 to rotate through arm 36. Rotation of shaft 34 rocks arm or frame 61 down until curved surface 62 strikes stop 49. Continued movement of the frame pushes and reciprocates the stop down until wings 50 engage guide 48. Such movement of the stop rocks shaft 44, causing arm 43 to push rod 39—39$^a$ back to set position, whereupon, spring 56 immediately causes latch 52 to snap into holding engagement with dog 39$^b$. Upon stop 49 being returned to its normal position, the frame is prevented from further movement in that direction. Pawl 40 is at that time in engagement with the teeth of wheel 35 and the spring motor is held from further exertion of its power.

The U-shaped leaf spring allows the pawl carrying end to move out of alinement with section 39$^a$ during this movement of the arm and also enables pawl 40 to find a proper engagement with a tooth of wheel 35 should it initially contact with the peak of one of such teeth. An abutment 40$^a$ may be provided to limit the downward movement of the pawl carrying section of rod 39.

As long as frame 61 is rocking downwardly, spring motor 28 is rotating chart disk 21. When the movement of the frame is limited and the motor 28 stopped, the rotation of disk 21 is stopped.

The curvature of the rocking frame 61 is so calculated that it will move proportionately to the square of the differential pressure, and the rotation of chart disk 21 will be proportional to the square root of the differential pressure. For instance, if the chart disk 21 is rotated two one-hundredths of a circle when the differential pressure is four, it will rotate four one-hundredths when the differential pressure is sixteen, two being the square root of four, and four, which is twice two, being the square root of sixteen.

The distance which the chart will rotate for each increase of one in the square roots will be determined by the gearing between shaft 20 and motor 28. This gearing will be calculated to include the value of the constant C of orifice meter in the formula above given. The gearing will have to be such, for instance, as to move the chart a greater distance when the device is used with a larger orifice than where the device is designed to be used with a smaller orifice; this is effected by changing the gearing.

When the frame 61 has been rocked to its downward limit, and pawl 37 has been released by the reverse movement of rod 39—39$^a$, spring 65, which is weaker than the spring motor 28, acting on arm 36, will return the frame to its normal position, and the parts will all be in readiness when the latch 52 is again moved to released position. This will, in the device shown, be at the end of a five minute period. If there is no fluctuation in the differential pressure during that time, the chart disk 21 will be rotated the same distance again. If there has been a fluctuation, the movement of the chart disk will vary accordingly. If there is no differential pressure, there is no flow of gas, and frame 61 cannot rock, so that disk 21 will not rotate.

Mounted at a suitable place at the upper part of the housing, is a static pressure gauge 66 of usual construction, having a pen arm 67 thereon which extends over the front of disk 21 and has a pen 68 thereon adapted to make a record on a chart secured to said disk. The lowermost limit of the pen represents its zero point, and the pen moves upwardly with an increase of pressure. Fig. 1 shows the relative positions of the pen and chart, the chart being indicated at X. The innermost of the concentric circles appearing on the chart designates the zero line, and the pen may not move inside this line.

For a better understanding of the invention, the chart is more specifically shown and described.

Figure 5:
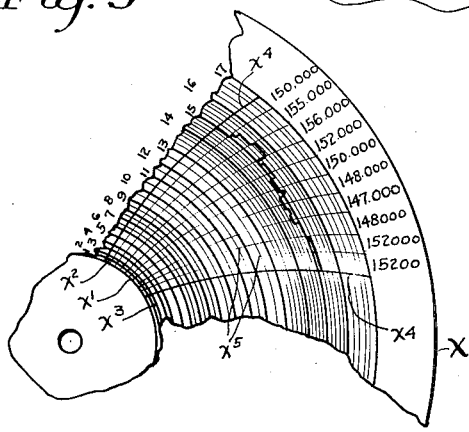
Fig. 5 shows a portion of a chart with a suppositious record thereon.

Fig. 5 shows a portion of a chart X which is of the usual circular form. Spaced outwardly from the center $x$ of the disk, is a concentric circle $x'$ designating the zero line. Outside of this line, at the proper distance, is a second heavy line circle designated $x^2$. This represents one pound of static pressure at absolute pressure, as distinguished from atmospheric pressure. At a proportionate distance outward, is a third circle $x^3$ which corresponds to the position of the pen at four pounds of static pressure. The square root of four is two, and this line is marked as 2, the second line being marked 1. At increasing distances outward are other concentric heavy line circles, the increase in distance corresponding to the logarithmic increase of the values of the squares. As the spaces between circles increase, the space between them is divided by lighter lines indicating fractions of the distance between heavy lines.

These charts are calibrated with reference to the movement of the pen, so that, when the pen is in a certain position, the line which it is on corresponds to the square root of the pressure which actuates the pen. For instance, when the pressure is one hundred pounds, the pen travels along heavy line designated 10; when it is one hundred and twenty-one pounds, it is on line marked 11; the marks being the square root of the pressure required to maintain the pen in position.

Crossing the concentric circles, are substantially radially disposed heavy curved lines $x^4$ numbered consecutively from one to ten, which are equi-distant. Equally dividing the space between lines $x^4$ into ten parts are lines $x^5$ extending in the same direction as lines $x^4$. The chart is thus divided into a hundred radial spaces.

If the distance around the chart on line $x'$ or the line indicating one pound pressure is represented as being one million cubic feet, each space on that line between lines $x^4$ represents one tenth of that, or one hundred thousand cubic feet, and each of the ten subdivisions of that space equals ten thousand cubic feet.

As has been seen, the chart is rotated according to the value of C of the formula $Q = C\sqrt{hp}$ and according to the square root of $h$ or the dynamic pressure, its movement indicating the product of $C\sqrt{h}$. Now it is necessary to multiply the product $C\sqrt{h}$ by the other factor, that is, the square root of $p$, the static pressure. As the square root of one is one, the first circle out from the zero line represents the square root of the static pressure at one pound. The next circle beyond that is located where the pen travels when the static pressure is four pounds, and is designated as 2, two being the square root of four. The next heavy circle marked 3 is where the pen travels at nine pounds of pressure. If the one pound circle represents one million cubic feet, the entire circle marked 2 represents two million cubic feet, and that marked 3 three million cubic feet, and the fractions or sub-divisions of each concentric circle increase accordingly, the concentric circles having the value of $\sqrt{p} \times C\sqrt{h}$. So that, for instance, when the static pressure is one hundred and forty-four pounds, the pen is at the circle bearing the numeral 12. The value of the entire circle represents twelve million cubic feet, and each of the one hundred subdivisions of this circle represents $12 \times 10,000$, 120,000 cubic feet.

With this understanding of the chart, the operation of the meter is easily followed. The chart is rotated a distance proportional to the square root of the differential pressure at regular intervals of time, its distance of movement at a given differential pressure bearing a certain ratio to the amount of gas which the orifice meter will pass in that period, its movement being a component of time and pressure. As the static pressure increases, the value represented by this movement of the chart increases. The pen arm, writing on the chart, therefore, moves outwardly and the record on the chart is proportionate to the static and differential pressures.

As an example, assume that the orifice meter will pass 1000 cubic feet of gas at the pressure at which it is to be used or sold, say one pound (though in practice it is generally less) in five minutes. Assume the average differential pressure for a given five minutes to be 16 inches and the static pressure to be 100 pounds. Working out the formula $Q = C\sqrt{hp}$, we have $$Q = 1000\sqrt{16 \times 100}$$
$$Q = 1000 \times 4 \times 10$$
$$Q = 40,000.$$

Thus, forty thousand feet would pass through the orifice meter in that time.

According to the present invention, with the constant C at 1000, and the differential pressure at 16, the chart would rotate four-tenths of one sub-division of the chart. As stated, each sub-division equals on the one pound line ten thousand cubic feet. Four-tenths of this distance on the one pound line would equal four thousand cubic feet. As the static pressure actuated pen at one hundred pounds pressure would make its mark on the circle indicated as 10, the value of the line of this length would be ten times its value on the one pound line, or forty thousand pounds.

In reading the chart, the reader takes the average amount indicated by the pen record for each sub-division around the chart, and adds the total amounts thus obtained. The result is the average amount of gas in terms of units of a desired constant value. These average amounts for each sub-division may be listed in the margin of the chart, as shown in Fig. 5.

The chart shown in Fig. 5 is arranged especially for lines in which high pressures maintain. Where the device is used on low pressure lines, the first few inner circles would have to be calibrated with greater accuracy and the static pressure gauge would be designed to move a greater distance under slight variations.

Various changes and modifications may be made in the construction of the device within the scope of my invention, and obviously, the positions of the static and differential pressure gauges could be changed so that the disk would rotate proportionately to the static pressure while the differential pressure would operate the pen.

As shown, the differential pressure gauge actuates against a minimum resistance, so that the device is very sensitive and delicate.

I claim as my invention:

1. In a recording device, means for moving a record sheet proportionately to a time factor and a variable factor, and a recording pen responsive to another variable factor related to the first variable factor positioned to mark on a record sheet so moved, whereby the single marking of such pen on the sheet represents a component of a fixed time factor and two variable factors.

2. In a recording device, a record sheet support, a record sheet thereon, periodically operated means for moving the record sheet supporting device proportionately to a known constant and a variable quantity, and a means responsive to another variable quantity for making a record on a sheet so moved.

3. The combination with a fluid meter, of means responsive to static and dynamic pressures, a record sheet moving means, means for periodically actuating said record sheet moving means, the movement of said record sheet moving means being controlled by one of said pressure responsive devices in proportion to the square root of the pressure to which such device responds, and a pen moved by the other pressure responsive device to make marks which bear a known relation to the square root of the pressure to which it responds.

4. The combination with a fluid meter, of a means responsive to static pressure and a means responsive to dynamic pressure, a chart, means for moving the chart, means controlled by one pressure responsive device for moving the chart proportionately to the square root of the pressure which actuates it, and a pen actuated by the other pressure responsive device.

5. The combination with a fluid meter, of a means responsive to static pressure and a means responsive to dynamic pressure, a chart, means for moving the chart periodically, means controlled by one pressure responsive device for moving the chart proportionately to the square root of the pressure which actuates it, and a pen actuated by the other pressure responsive device.

6. The combination with a pipe line for fluids, of means responsive to the dynamic pressure of the fluid in said line, other means responsive to the static pressure in said line, a chart moving mechanism, a chart, means controlled by one of said pressure responsive devices for actuating said chart moving mechanism proportionately to the pressure to which it responds, and a recording means actuated by the other pressure responsive device for making a record on said chart.

7. The combination with a fluid pressure meter, of a means responsive to dynamic pressure and a means responsive to static pressure, a chart, intermittently operated means for moving the chart, a stop for determining the distance said chart moving means is operated each time, said stop being controlled by one of said pressure responsive means in such manner that the distance of movement will always be proportional to the square root of the pressure to which said means is responsive, and a pen actuated by the other pressure responsive means.

8. A recording device comprising a pressure actuated pen, a chart, a motor for driving the chart, a pressure actuated stop, a stop engaging member arranged to be moved into contact with said stop by said motor to stop the motor, whereby the distance the chart is moved is proportionate to the pressure which actuates the stop, means for returning said stop engaging member to normal position after the motor has been stopped, and means for periodically releasing the motor.

9. A recordng device comprising a pressure actuated pen, a chart, a motor for driving the chart, means for normally holding the motor against actuation, a trigger mechanism for releasing said holding means, means for periodically releasing said trigger mechanism, a pressure actuated stop, a stop engaging member moved into contact with said stop upon the actuation of the motor to limit the distance the chart is moved proportionately to the position of the stop, and means for re-setting the trigger mechanism and moving said motor holding means into normal holding position upon said stop engaging means being brought into motor stopping engagement with said stop, and means for returning said stop engaging means to normal position.

10. A recording device comprising a pressure actuated pen, a chart, a motor for driving the chart, means for normally holding the motor inoperative, means for periodically releasing said means to allow the motor to operate, a pressure actuated stop, an arm having a curved stop engaging surface adapted to be rocked by the actuation of the motor into contact with the stop to stop the motor, the curve of said arm being so plotted and positioned relatively to the path of travel of the stop that the distance it rocks will be proportionate to the square root of the pressure to which the stop responds, and means whereby the movement of said arm into stop engaging position will set the motor holding means in position to hold the motor inoperative, and means for returning the curved arm to normal position after said setting has been effected.

11. A recording device for fluid meters comprising a pen actuated by fluid pressure, a chart on which the pen records, a motor for driving the chart, a ratchet wheel driven by the motor, a reciprocable rod having a pawl thereon for engagement with the ratchet wheel to hold the motor from operation, a trigger mechanism for releasing the pawl by allowing the rod to reciprocate in one direction, a motor driven cam for actuating the trigger, whereby the motor will operate periodically, a rock shaft, a link connecting said rod with said rock shaft whereby said shaft will be rocked by the movement of the rod, an arm on said shaft, an indicator arm pivoted to said first arm, a stop carried at the end of the indicator arm, a guide for said stop, said stop being moved away from said guide by the rocking movement of said shaft, a pressure responsive means for oscillating said indicator arm, a second shaft, a curved stop engaging frame on said shaft, a pawl on said shaft adapted to be moved by reciprocation of said rod into and out of engagement with the ratchet wheel, being arranged to move into engagement therewith when said first pawl moves into motor releasing position, whereby said stop engaging frame will be moved into engagement with said stop when the motor operates, said frame being so curved and positioned relatively to the path of travel of the stop that its movement is proportional to the square root of the pressure which actuates the stop, said stop engaging frame when contacting with the stop serving to force it into contact with the guide to rock said first shaft in the reverse direction and re-set said trigger mechanism for reciprocating said rod in the reverse direction, and means for returning said frame to normal position.

12. A recording device for fluid meters comprising a pen carrying arm, a static pressure responsive means for moving the arm, a chart on which the pen records, a motor for moving the chart, means for periodically effecting the operation of the motor, and a stop mechanism for the motor responsive to differential pressure for limiting the operation of the motor at each periodic actuation thereof.

13. A recording device for fluid meters comprising a housing having a hermetically sealed chamber thereon, a differential pressure gauge in communication with said chamber, said gauge having a float therein, a rod actuated by said float, means projecting into said chamber connected with said rod, a movable stop member in said chamber connected with said rod through said means, said arrangement enabling said stop to be moved by said float without any packings being employed, a motor in said housing, means for causing a periodic actuation of the motor, means in said chamber for engagement with said stop for stopping the motor, a chart driven by the motor, and a static pressure actuated pen for recording on said chart.

14. A recording device for fluid meters comprising a chart, a chart actuating mechanism, a variable limited stop therefor, a pressure responsive means connected with the limiting stop for limiting the movement of the chart, and a pressure responsive recording pen.

15. A recording device comprising a chart, a periodically operable mechanism for moving the chart, a variable control element associated with said mechanism, a pressure responsive means operatively connected with the control element whereby a variable periodic movement of the chart is obtained, and a pressure responsive pen for recording on the chart.

16. A recording device comprising a chart, a periodically operable mechanism for moving the chart, pressure responsive means connected with and actuated by the pressure responsive means for limiting the movement of the chart moving mechanism proportionately to the square root of the pressure to which said limiting means responds, and a pressure responsive pen for recording on the chart.

17. In a recording device, a record sheet, means for periodically moving the record sheet, means for limiting the movement of the record sheet, a variable actuating means for operating the limiting means proportionately to the value of a variable quantity, and means for recording on the record sheet.

18. The combination with a fluid meter of the orifice type, of an integrating and recording device including a record sheet, means for moving the record sheet, pressure responsive means for controlling the operation of the record sheet moving means, a pressure responsive means for marking on the chart, one of said pressure responsive means being responsive to static pressure and the other to differential pressure.

19. In a recording device, means responsive to static and dynamic pressure, a record sheet, means for periodically moving said record sheet a distance in proportion to the square root of one of the pressures to which said device responds and a pen moved by the other pressure responsive device.

20. In a recorder device, means responsive to static and dynamic pressure, a record sheet, means for periodically actuating said record sheet a distance proportional to the square root of the pressure to which said device responds and a pen moved by the other pressure responsive device to make marks which bear a known relation to the square root of the pressure to which its responds.

21. The combination with a fluid meter of the orifice type, of an integrating and recording device including a record sheet, means for moving the record sheet in accordance with the size of the meter orifice, pressure responsive means for controlling the operation of the record sheet moving means, a pressure responsive means for marking on the chart, one of said pressure responsive means being responsive to static pressure and the other to differential pressure.

22. A recording device for fluid meters comprising a chart, means for periodically moving said chart, and means for limiting the extent of movement in accordance with the square root of the pressure of the fluid.

23. A recording device for fluid meters comprising a chart, means for moving said chart a distance proportionately to the square root of the dynamic fluid pressure being measured, and a pen for recording on said chart movable in accordance with the square root of the absolute static fluid pressure.

24. In a recorder for a fluid meter, a chart, mechanism operating said chart periodically at a rate determined by the value of the meter constant, means controlled by a variable factor for determining the extent of periodic movement of said chart, and means controlled by another variable factor for making a record on said chart.

25. In a recorder for a fluid meter, a chart, mechanism for operating said chart periodically at a rate determined by the value of the meter constant, means controlled in accordance with the square root of a variable factor for determining the extent of periodic movement of said chart and means controlled by the square root of another variable factor for making a record on said chart.

26. In a recorder for a fluid meter, means responsive to static pressure, means responsive to dynamic pressure, a chart, means for periodically operating the chart at a rate determined by the value of the meter constant, means controlled by the square root of one of said two first named means for determining the extent of periodic movement of said chart and means controlled in accordance with the square root of the other of said first two named means for making a record on said chart.

In testimony whereof I affix my signature.

JAMES R. ARMSTRONG.